UNITED STATES PATENT OFFICE.

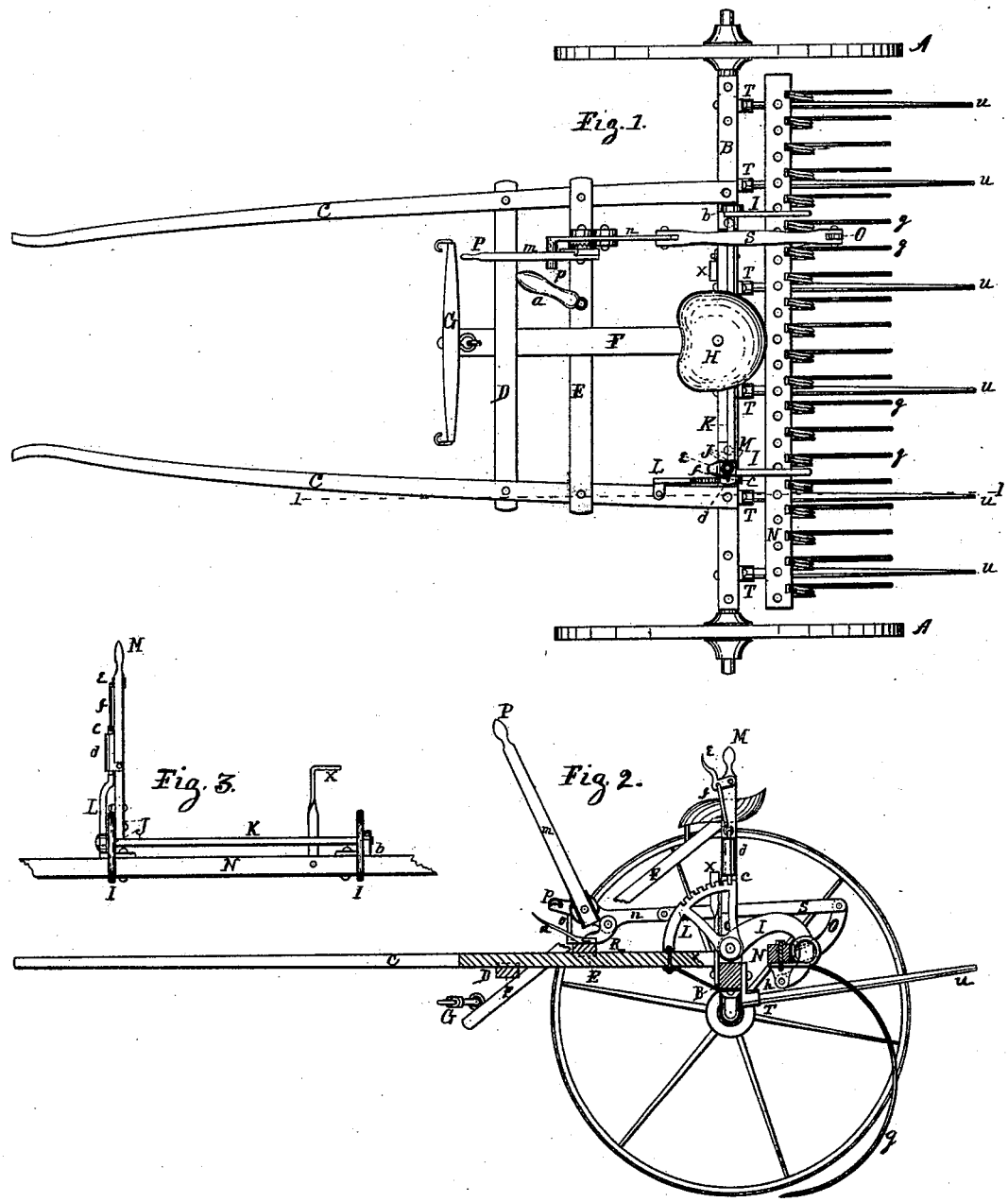

ORLANDO CLARKE, ISAAC UTTER, AND MARQUIS L. GORHAM, OF ROCKFORD, ILLINOIS.

IMPROVEMENT IN HORSE-RAKES.

Specification forming part of Letters Patent No. 171,777, dated January 4, 1876; application filed June 25, 1875.

*To all whom it may concern:*

Be it known that we, ORLANDO CLARKE, ISAAC UTTER, and MARQUIS L. GORHAM, all of the city of Rockford, State of Illinois, have invented a Horse Hay-Rake, of which the following is a specification:

The object of our invention is to provide means in the construction of rakes by which the driver in his seat can change the working depth of the rake-teeth at pleasure without stopping, so as to cause them to work closer to or farther from the surface of the ground, as circumstances may require; and consists in the devices and combinations which we now proceed to describe.

In the drawing, Figure 1 is a plan view of a rake embodying our invention. Fig. 2 is a sectional elevation taken on dotted line 1 in Fig. 1. Fig. 3 is a rear view of a central portion of the axle, and of devices thereon erected, which will be referred to hereinafter.

In the drawings, A are carrying-wheels, fitted to revolve on axle-arms secured to axle B. C are thills secured to axle B, and are fitted with cross-bars D and E. A bar, F, placed centrally between the thills, and between the bars D and E, to which it is secured, inclining rearward, serves the double purpose of a draft-bar and seat-support, the single-tree G being hinged to its lower and forward end, and the driver's seat H secured to its upper and rear end. A foot-rest, $a$, is secured to cross-bar E. J is a lever, one arm of which consists of curved brackets I, rigidly secured to a shaft, K, which has its fulcrum-bearings in angle-bracket $b$, secured to the axle, and in the base of a segment-toothed ratchet, L, secured to the axle and thill. One of the curved brackets has an upward projection, to which the arm M of lever J is rigidly secured. This arm M is provided with a spring-bolt, $c$, in case $d$, fitted to engage the ratchet-teeth in segment L. The bolt $c$ is operated by finger-lever $e$, being connected therewith by link $f$. Metallic brackets $h$ are connected by a hinge-joint to the extreme end of brackets I of lever J, and the brackets $h$ are rigidly secured to the under side of the rake-head N. Thus the rake-head is connected to the axle of the carriage by two hinged joints, the one arm of lever J consisting of the curved brackets, forming the connecting-link. The rake-teeth $g$ are of the usual curved form, and are wound in a spiral coil near the rake-head, to which they are securely fixed at proper intervals, and held by hook-bolts. O is an arm, secured to the rake-head N, and extends to the rear and curves upward in such a manner that its extreme end is on a higher level than the rake-head. P is a lever, composed of two parts, $m$ and $n$, and are connected by a rosette-joint with radial corrugations, for the purpose of changing the angle of the parts, and are held in position by means of a screw-bolt. This lever is hinged in a bracket, R, secured to cross-bar E, and is provided with a stop, $o$, on which the forward extension of part $n$ rests. This part of the lever is provided with a foot-piece, $p$, by means of which the operator can hold it in contact with the stop $o$. The lever P, as a whole, is connected with the curved arm O by means of a link, S. T are metallic sockets, secured to the axle at proper intervals, and are adjustable vertically, and receive rods $u$, which extend rearward between the rake-teeth.

By means of the lever P, and its connection with curved arm O by link S, the driver is enabled to hold the rake in working position by resting his foot on the foot-piece $p$, and, to unload or drop the hay, he removes his foot from the rest $p$ to foot-rest $a$, and, by means of the lever P, breaks the joint of connecting-link S and arm $n$ of lever P, which causes the teeth to rise, the rake-head having a rolling motion on its hinged connection with lever J, and the rods $u$ discharge the load from the teeth. The swinging hook $x$, hinged to the axle, is designed to hook over the part $m$ of lever P, and hold the rake-teeth in an elevated position when moving from place to place.

By means of arm M of lever J, and its connection with the rake-head, the driver can raise or lower the rake, and carry the teeth clear of the surface, or cause them to adhere to the surface with any required degree of force, and, by means of the spring-bolt and segment-toothed ratchet, can lock it in the required position without stopping; and in raising and lowering the rake by means of the lever J, the teeth will rise nearly in a vertical plane, and not materially change the angle of the teeth with the surface of the ground.

We claim as our invention—

1. The lever J, hinged to the axle B and rake-head N, with rake-teeth thereto attached, for the purpose of changing the working depth of the teeth without materially changing their relative angle with the surface of the ground, substantially as described and shown.

2. The combination of the rake-head N, having teeth thereto attached, lever J, bolt c, and segment-toothed ratchet L, for the purpose of holding the rake in different positions, substantially as described.

ORLANDO CLARKE.
ISAAC UTTER.
MARQUIS L. GORHAM.

Witnesses:
H. B. UTTER,
M. L. UTTER.